United States Patent Office 3,268,906
Patented August 23, 1966

3,268,906
METHOD OF RECORDING ELECTRICAL SIGNALS
Fred Mast, Zurich, Switzerland, assignor to Gretag Aktiengesellschaft, Zurich, Switzerland
No Drawing. Filed Dec. 26, 1961, Ser. No. 162,252
Claims priority, application Switzerland, Dec. 27, 1960, 14,435/60
4 Claims. (Cl. 346—1)

This invention relates to a method of recording electrical signals, particularly image signals such as, for example, television signals.

Various processes have already been proposed for the recording of electrical signals, such as television signals for example. The method most frequently used is magnetic recording. The very large band-width of the television signals to be recorded necessitates the use of a very high tape speed or, if such inadmissible tape speeds are to be avoided, considerable complication of the equipment, for example rotating recording heads. It has also been proposed to record signals in the form of electric charges on a strip of thermoplastic material which, after the signals have been applied in the form of electric charges, is heated to its softening temperature so that it undergoes deformation under the action of the electrostatic forces of these charges. After cooling, therefore, the recording of the electrical signals is in the form of variations in thickness of a thin film.

The present invention relates to a further development of such methods. According to the present invention there is provided a method of recording electrical signals, comprising the steps of subjecting to the action of an electron beam modulated by a signal to be recorded a thin film of a substance, the degree of polymerization of which is variable by electron radiation, and converting the resultant local differences in the degree of polymerization into local differences of the film thickness.

The substances used to make the thin film may be selected from those in which either polymerization or depolymerization occurs on irradiation with an electron beam. The type of film material used determines the following step for converting the local differences in the degree of polymerization into local differences in film thickness. If the electron beam produces polymerization of the film, this polymerization is converted into local thickness variations by swelling of the film. The agents used to swell the film may, for example, be weak solvents, plasticisers or similar substances with which the film is brought into contact. On swelling, the regions of the film which have been subjected to less irradiation result in greater film thicknesses. Alternatively, the non-irradiated non-polymerized regions of the film can be dissolved out by a suitable solvent, in which case the regions which have been subjected to less irradiation result in smaller film thicknesses.

If the electron beam produced depolymerization of the film material, this depolymerization is converted into local thickness variations by partial dissolution of the film. This can again be effected by swelling or by treatment with a solvent, in which case the reverse pattern is obtained for the remaining film thicknesses from that obtained in the case of polymerization.

Recordings of this kind are non-erasable. Thus recordings can be produced only once on a strip and then remain as permanent recordings.

Suitable film materials are high-polymer substances having large molecules which are not cross-linked (thermoplastics), while the molecular weight should be as high as possible in order to obtain maximum sensitivity for the recording process.

Natural rubber and other polymerizable types of rubber, such as silicone rubber for example, have, inter alia, proved suitable as film materials with which local polymerization occurs by electron bombardment. Gelatin or polymethacrylates, for example, are suitable for recording by polymerization and subsequent dissolution.

The present method, in comparison with the method employing magnetic recording, gives a considerable reduction of the recording support area required for an equal length of information. The recording of television image signals does not take the form of a train of signals but as an image reproduced topologically. In view of the fine division of the line-scanning pattern obtainable with a cathode ray, the space required for the individual image is very small and hence there is a considerable saving in recording area in comparison with magnetic recording. The recording area required, for example, for the recording of a television image with the present method is substantially the same size as the picture area of 16 mm. narrow-gauge film (=about 80 square mm.). To record the same image on magnetic tape, for example, if the method known by the trade name "Ampex" is used, requires a recording area of 630 square mm.

In comparison with the other method mentioned, in which recording takes place as a result of the action of static charges upon a film heated to softening point, the present method dispenses with the need for heating and cooling. Moreover, in such a method the film thickness and anode voltages are interconnected. The deforming charges should not penetrate into the film but should lie as close to the surface of the film as possible to give the the maximum thickness variation. Furthermore, the fineness of the recording is all the greater, the higher the anode voltage—and hence the greater the concentration of the anode spot—and the smaller the film thickness. Thus in the methods employing film thickness variation produced by electrostatic charges, this relationship limits the fineness of the recording and imposes limits on the reduction possible for the area required for recording. Moreover, the recording is erased by heating. This factor may possibly limit the brightness of the projected images when the recording is reproduced by optical projection, since it will limit the amount of heat admissible for the recording film. In comparison with this, when the present method is used, the local thickness variations obtained after the recording has been converted by swelling or by dissolving away, are practically insensitive to heating. In comparison with the known processes for image recording by means of photographic emulsions (silver halide emulsions), no complicated chemical development processes are necessary, but simply a "physical" development, i.e. treatment in a single bath.

As already stated, the recorded signal, particularly an image recording, is reproduced by direct projection of the recorded image, preferably by the use of a Schlieren optical system, which converts the film thickness variations into brightness variations on the screen.

During recording there is an optimum relationship between the bombarding beam and the film thickness. The film thickness should not be more than the depth of penetration of the electrons and in the optimum case is substantially the same as this. If the anode voltage (acceleration voltage) used is 15 kv., the depth of penetration is about $3\mu$. If thicker films are used, the method employing polymerisation is liable to result in a peeling-off of the film on the subsequent conversion into local thickness variations. If the film thickness is made equal to the depth of penetration of the electrons, a further advantage obtained is that the increase in the dot size resulting from dispersion of the electrons penetrating into the recording film is kept within admissible limits.

As already stated, one of the main fields of application of the present recording method is the recording of image signals, for example of television images. The present invention, however, is in no way limited to this recording of television images, but is on the contrary suitable for the recording of other signals as well. Thus the method can be used, for example, to make screened printing plates starting from an electrical signal or a sequence of electrical signals. In comparison with recording point-by-point on photo-sensitive emulsions, this method has the advantage of higher recording speed, since the sensitivity of the present method is much greater than the sensitivity of emulsion used for photographic recording purposes. When such printing plates are made, the generally substantially coarser screen enables electron systems to be used in which the film to be irradiated is under normal pressure, while the electron beam produced in vacuo emerges through an aperture in the vacuum vessel. Such apertures generally result in a certain dispersion of the electron beam, but this can be accepted in view of the coarser screen admissible for printing.

The invention is not limited to the above-described forms of performance. Thus, for example, in the recording of images it is possible to dye the recording film either before or after the production of the thickness variations. In this case, a recording is obtained by means of varying density which can be projected by an ordinary projection system instead of the above mentioned Schlieren system. This method can be developed by constructing the recording material of two layers, a dye-containing layer being disposed beneath the layer the degree of polymerisation of which is variable by electron irradiation. The dye used in this layer has a greater solubility in the solvent used to dissolve away the irradiated (or non-irradiated) parts of the film than on the irradiated layer. If the material is treated with this solvent after the electron irradiation, the solvent passes to the dye-containing layer at the regions of lesser thickness and dissolves the dye away at these regions so that an image recording is obtained which is intensified by the dye. The present invention can naturally also be used for recording signals other than image signals, i.e. signals the sequence of which does not correspond to the topographic construction of an image from lighter and darker portions.

Without limiting the invention to the use of the substances indicated below, the following substantances, for example, have proved suitable for the recording film as already indicated: Rubber, silicone rubber, gelatin and polymethacrylates. If rubber is used as the film material, ordinary mineral oil is suitable for swelling purposes. When silicone rubber is used, the parts of the film which are less intensively polymerized can be dissolved with a mixture of petroleum ether and benzene; when gelatin is used, the less intensively polymerized parts of the film can be dissolved away with water or swelling may be carried out with glycerin. When polymethacrylates are used the less intensively polymerized parts of the film can be dissolved away with petroleum ether.

It is not necessary for swelling or dissolution to be carried out immediately after the recording by electron irradiation of the film. It is possible to store the strip in the untreated state after irradiation and to carry out the further treatment just before reproduction (reading).

The invention will now be illustrated by the following non-limitative examples:

*Example 1*

A 5% aqueous solution of a gelatin, corresponding to the gelatin used for normal silver halide emulsions in photography, was poured on to an approximately 0.1 mm. thick triacetate support, so that after setting and drying the thickness of the gelatin coating was about $4\mu = 0.004$ mm.

This gelatin coating was then swept by an electron beam over adjacent lines in the manner of a television line-scanning pattern using an electronic system known from the television art to produce the electron beam. The focussed spot of the electron beam had a diameter of 0.04 mm. In order to bombard the gelatin in the form of a raster, the intensity of the electron beam was modulated with an A.C. voltage.

After the gelatin coating had been covered by the electron beam, the gelatin coating was washed out with hot distilled water at a temperature of 35° C. This gave a gelatin surface which reproduced in the form of a thickness variation the raster resulting from the scanning movement and the intensity modulation of the electron beam. This raster is particularly clearly recognised when viewed with a dark-field optical system.

*Example 2*

Example 1 was repeated using a 0.003 mm. thick coating of rubber instead of gelatin, and the coating was washed out with petroleum ether.

*Example 3*

Example 1 was repeated, but, instead of being washed out with water the gelatin film was swollen with a 50% water-glycerin solution at room temperature, the thickness variations being even greater for the same beam intensity.

*Example 4*

Example 2 was repeated, but, instead of washing out the bombarded rubber film with petroleum ether, it was made to swell by means of a petroleum ether mineral oil solution, those parts of the film which had been more intensively irradiated undergoing the least swelling.

*Example 5*

A methyl methacrylate film of a thickness of 0.003 mm. was produced on a 1 mm. thick glass support in the following way. A 5% solution of methylmethacrylate in chloroform was centrifuged on a glass plate until the chloroform solvent had evaporated.

This film was swept in the manner described in Example 1 with an intensity-modulated electron beam. The film thus treated was then treated in a bath comprising a mixture of 70% petroleum ether and 30% chloroform, the said film being more intensively dissolved at the zones subjected to the greater intensity of irradiation. The locally varying dissolution again forms a reproduction of the scanning raster in the form of local thickness variations of the film. The resultant raster can be clearly seen especially in a dark-field optical system.

I claim:

1. A method of recording continuously changing electrical signals on a moving tape which comprises the steps of providing an electron beam, modulating the intensity of the current of said electron beam in dependence upon a signal to be recorded, subjecting to the action of said beam a moving tape having at least a surface film which polymerizes when irradiated by said current modulated electron beam thereby to effect a degree of polymerization of said surface film which varies as a function of the intensity of said beam current and thereby producing in said surface film a latent image with intermediate tone values, and thereafter subjecting said polymerized surface film to the action of a swelling agent thus producing a film thickness inversely proportional to the changes in said signals.

2. The method as defined in claim 1 of recording electrical signals on tape wherein said polymerizable surface film is a rubber material selected from the group consisting of natural rubber and silicone rubber.

3. The method as defined in claim 1 of record-electrical signals on tape wherein said swelling agent is one selected from the group consisting of weak solvents and plasticisers for said surface film thus producing the film thickness inversely proportional to the changes in said signals.

4. A method of recording continuously changing electrical signals on a moving tape which comprises the steps of providing an electron beam, modulating the intensity of the current of said electron beam in dependence upon a signal to be recorded, subjecting to the action of said beam a moving tape having at least a surface film which depolymerizes when irradiated by said current modulated electron beam thereby to effect a degree of depolymerization of said surface film which varies as a function of the intensity of said beam current and thereby producing in said surface film a latent image with intermediate tone values, and thereafter subjecting said depolymerized surface film to the action of a swelling agent thus producing a film thickness proportional to the changes in said signals.

References Cited by the Examiner

UNITED STATES PATENTS 2,748,288   5/1956   Saulnier _____ 250—65

BERNARD KONICK, *Primary Examiner.*

IRVING L. SRAGOW, *Examiner.*

R. M. JENNINGS, P. F. ROTH, *Assistant Examiners.*